United States Patent [19]

Makita

[11] Patent Number: 4,852,092
[45] Date of Patent: Jul. 25, 1989

[54] ERROR RECOVERY SYSTEM OF A MULTIPROCESSOR SYSTEM FOR RECOVERING AN ERROR IN A PROCESSOR BY MAKING THE PROCESSOR INTO A CHECKING CONDITION AFTER COMPLETION OF MICROPROGRAM RESTART FROM A CHECKPOINT

[75] Inventor: Akihisa Makita, Tokyo, Japan

[73] Assignee: NEC Corporation, Tokyo, Japan

[21] Appl. No.: 86,638

[22] Filed: Aug. 18, 1987

[30] Foreign Application Priority Data

Aug. 18, 1986 [JP]  Japan .................... 61-193549
Aug. 18, 1986 [JP]  Japan .................... 61-193550

[51] Int. Cl.⁴ ............................................ G06F 11/00
[52] U.S. Cl. ................................ 371/12; 364/200; 371/16
[58] Field of Search ............... 371/9, 12, 11, 16, 8, 371/13; 364/200

[56] References Cited

U.S. PATENT DOCUMENTS

| | | | |
|---|---|---|---|
| 3,736,566 | 5/1973 | Anderson et al. | 371/12 |
| 4,566,103 | 1/1986 | Sato et al. | 371/12 |
| 4,586,180 | 4/1986 | Anders et al. | 371/12 |
| 4,627,054 | 12/1986 | Cooper et al. | 371/11 |
| 4,641,305 | 2/1987 | Joyce et al. | 371/12 |

FOREIGN PATENT DOCUMENTS

| | | | |
|---|---|---|---|
| 105710 | 4/1984 | European Pat. Off. | 371/16 |
| 143646 | 9/1982 | Japan | 371/9 |
| 2047446 | 11/1980 | United Kingdom | 371/16 |

Primary Examiner—A. D. Pellinen
Assistant Examiner—Geoffrey S. Evans
Attorney, Agent, or Firm—Foley & Lardner, Schwartz, Jeffery, Schwaab, Mack, Blumenthal & Evans

[57] ABSTRACT

In an error recovery system for use in combination with a multiprocessor system processing instructions under microprogram control which is energized on occurrence of an intermittent error in one of the processors to restart the microprogram from a checkpoint in the faulty processor when the microstep restart is allowable and which is energized upon occurrence of a physical error to make another processor take over execution of an instruction processed in the faulty processor, the faulty processor generates a physical error signal after completion of the microprogram restart so that another processor is forced to take over next succeeding procession to be carried out in the faulty processor. When retry of execution of the instruction is allowable on occurrence of the intermittent error, another processor is also forced to take over execution of the instruction. A retry request can previously and manually be inputed into the one processor by an operator so that retry of execution of the instruction is carried out in the faulty processor.

6 Claims, 7 Drawing Sheets

ERROR RECOVERY SYSTEM OF A MULTIPROCESSOR SYSTEM FOR RECOVERING AN ERROR IN A PROCESSOR BY MAKING THE PROCESSOR INTO A CHECKING CONDITION AFTER COMPLETION OF MICROPROGRAM RESTART FROM A CHECKPOINT

BACKGROUND OF THE INVENTION (1) Field of the Invention

The present invention relates to an error recovery system for use in an electronic digital computer system comprising a plurality of processors and, in particular, to such an error recovery system for use in a tightly coupled multiprocessor system.

(2) Description of the Prior Art

As an electronic digital computer system, a tightly coupled multiprocessor system is known in the prior art which comprises a main memory for storing a plurality of programs and a plurality of processors for processing the programs. Each program comprises a succession of instructions. As a known one of the tightly coupled multiprocessor system, ACOS 1500 manufactured by NEC Corporation is disclosed by M. Baba et al in NIKKEI ELECTRONICS No. 373 issued by Nikkei McGraw-Hill Co. in July 15, 1985 under the title of "A large computer ACOS 1500 having an increased processing speed by use of two-level cashe and an improvement of pipeline processing" (Reference 1).

On occurrence of an error or fault during execution of one instruction in one of the processors in ACOS 1500, the processor is made to retry execution of the instruction in order to recover the error in one of the processors, as disclosed in Reference 1. When the error is intermittent or transient, retry results in success. Then, the processor is continuously used in the computer system. When the error is a long lived, hardware, or physical error, retry is not well completed or ends in failure. Then, the processor is made into a checking condition and another of the processors is made to take over execution of the instruction by transferring status data in the faulty processor into another processor through the main memory.

An instruction fetched in one processor is executed by an executing means in the one processor under control of a microprogram comprising a succession of microsteps. In ACOS 1500, the microprogram has at least one predetermined checkpoint in the microsteps. When an error occurs in one of the processors, the microprogram is restarted from the last checkpoint before the error occurrence, as disclosed in Reference 1. When the microprogram restart ends in success, the one processor is continuously used as a normal processor in the system.

However, once a processor encounters an error, another error tends to again occur in the processor even after retry is well completed, which results in the system going down.

British Patent Specification No. 1,163,859 (Reference 2) by J. A. Arulpragasam discloses an error recovery system for, on occurrence of an error in one of the processors, making another processor take over execution of an instruction executed in the faulty processor by transferring status data in the faulty processor into another processor through the main memory.

U.S. Pat. No. 4,443,849 (Reference 3) by Ohwada assigned to Nippon Electric Co., Ltd. discloses an error recovery system for transferring the status data in the faulty processor to another processor through not the main memory but an additional storage.

However, the references 2 and 3 are silent as to the microprogram restart.

SUMMARY OF THE INVENTION

It is an object of the present invention to provide an error recovery system for use in a multiprocessor system which, on occurrence of an error in one of the processors, is capable of making the one processor into a checking condition after completion of the microprogram restart from the checkpoint to thereby reduce the effect of a system going down.

An error recovery system to which this invention is applicable is for use in combination with an electronic computer system comprising a main memory for storing a plurality of programs and a plurality of processors for processing the programs. Each program comprises a succession of instructions. Each processor comprises an executing unit for fetching selected ones of the instructions and for executing under microprogram control each of the selected instructions, during a first period of time during which retry of execution of the selected instruction is allowable and a second period of time during which retry of execution of the selected instruction is not allowable, to produce masses of information. The microprogram comprises a succession of microsteps and has a first interval during which restart of the microprogram is allowable from a checkpoint at a predetermined microstep. Each processor further comprises a monitoring unit for monitoring operation of the executing unit to produce an error signal when an error is detected during execution of a particular one of the selected instructions and to suspend execution of the particular instruction, instruction retry enable signal producing unit operatively coupled to the monitoring unit for producing an instruction retry enable signal during the first time period, and microprogram restart enable signal producing unit operatively coupled to the monitoring unit for producing a microprogram restart enable signal during the first interval. The error recovery system is responsive to the error signal from the monitoring unit in a first of the processors and accesses the microprogram restart enable signal producing unit in the first processor to produce a microprogram restart signal when the microprogram restart enable signal is detected from the microprogram restart enable signal producing unit. The first processor carries out, in response to the microprogram restart signal, restart of the microprogram from the checkpoint. The error recovery system is energized on occurrence of a physical error in the first processor to make a second of processors take over execution of the particular instruction.

According to the present invention, the first processor further comprises a physical error signal generating unit being operatively coupled with the monitoring unit therein for detecting, after completion of restart of the microprogram, the instruction retry enable signal from the instruction retry enable signal producing unit in the first processor to produce a physical error signal. The error recovery system comprises a unit responsive to the physical error signal for producing a taking-over signal to thereby put the first processor in a checking condition.

DESCRIPTION OF PREFERRED EMBODIMENT

Figure 1:
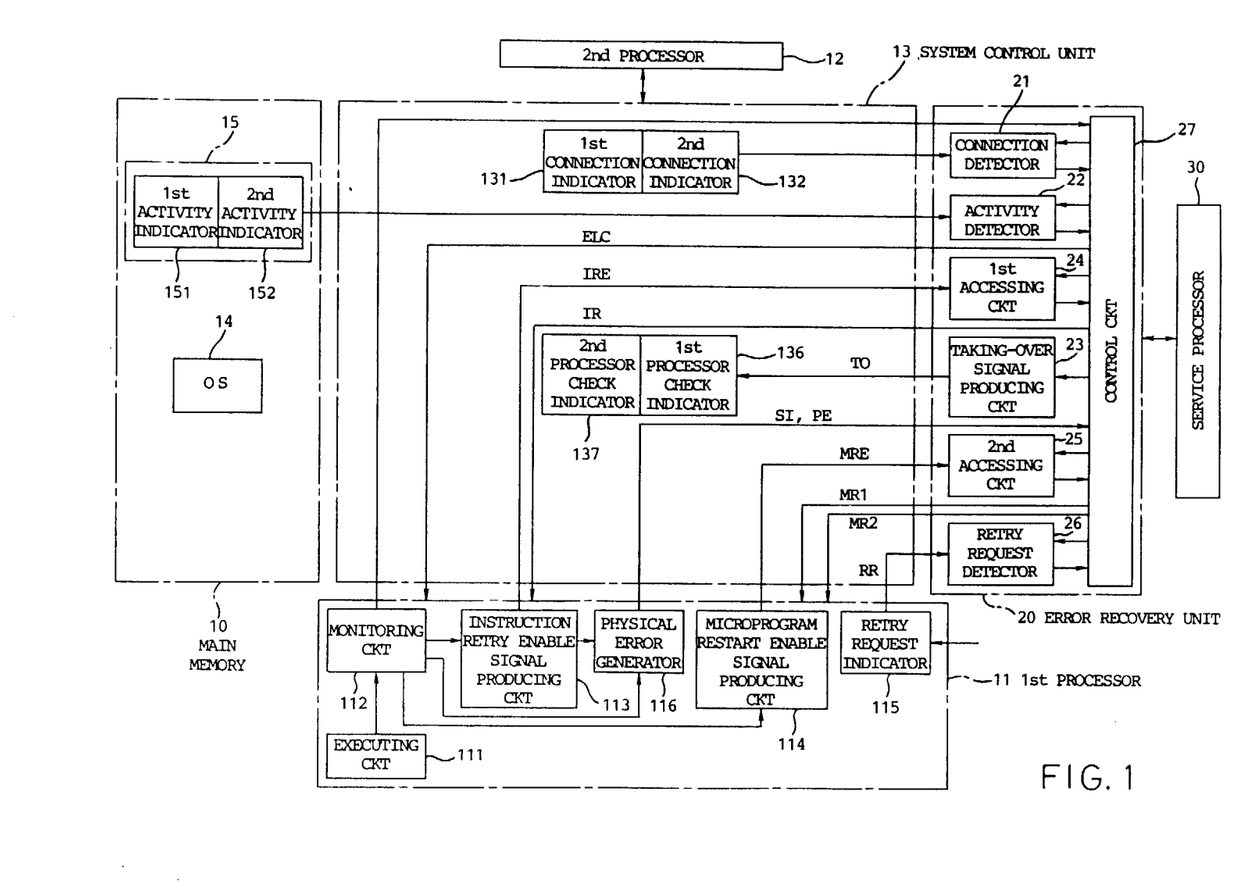
FIG. 1 is a block diagram of an error recovery system in combination with a multiprocessor system according to an embodiment of the present invention.

Referring to FIG. 1, an electronic digital computer system or a tightly coupled multiprocessor system in combination with an error recovery system according to an embodiment of the present invention comprises a main memory 10 storing a plurality of programs. Each program comprises a succession of instructions. The computer system has a plurality of processors (first and second processors 11 and 12 are exemplarily shown in the figure) for processing selected ones of the instructions. The first and second processors 11 and 12 are coupled with the main memory 10 through a system control unit 13. The main memory 10 has an operating system (OS) 14 therein for supporting activities of the computer system itself.

The main memory 10 has an memory area 15 which has first and second activity indicators 151 and 152 of memory cells for indicating active conditions of the first and second processors 11 and 12, respectively.

The system control unit 13 is provided with first and second connection indicators 131 and 132 such as flipflops for indicating connection of the first and second processors 11 and 12 to the computer system, respectively. When the processors 11 and 12 are not connected to the computer system, the flipflops 131 and 132 are reset, respectively. The flipflops 131 and 132 are set by the completion of connection of respective processors to the system.

The system control unit 13 further has first and second processor check indicators 136 and 137 such as flipflops for indicating checking conditions of first and second processors 11 and 12, respectively. When one of the first and second processors 11 and 12 encounters a physical error, the one of the processors is in a checking condition and the corresponding one of the first and second processor check indicators 136 and 137 is set.

The first processor 11 comprises an executing circuit 111 for fetching a selected one of the instructions from the main memory 10 and for executing, under microprogram control, the selected instruction to produce masses of information. Execution of the selected instruction by the executing circuit 111 is carried out over a time duration consisting of a first period of time during which retry of execution of the selected instruction is allowable and a second period of time during which retry of execution of the selected instruction is not allowable, as will later be described in detail with reference to FIG. 2. The executing circuit 111 has registers (not shown) such as a general register, instruction counter, and others, which are called software visible registers.

The first processor 11 further comprises a monitoring circuit 112 for monitoring activity of the executing circuit 111. The monitoring circuit 112 comprises an error detecting circuit (not shown) such as a parity check circuit, a coincidence deciding circuit of arithmetic results, a sequence legality checking circuit, and/or others. Each error detecting circuit produces an error signal (ER) when detecting an error during execution of the selected instruction by the executing circuit 111. In response to the error signal, the monitoring circuit 112 suspends execution of the selected instruction, as described in Reference 3.

Figure 2:
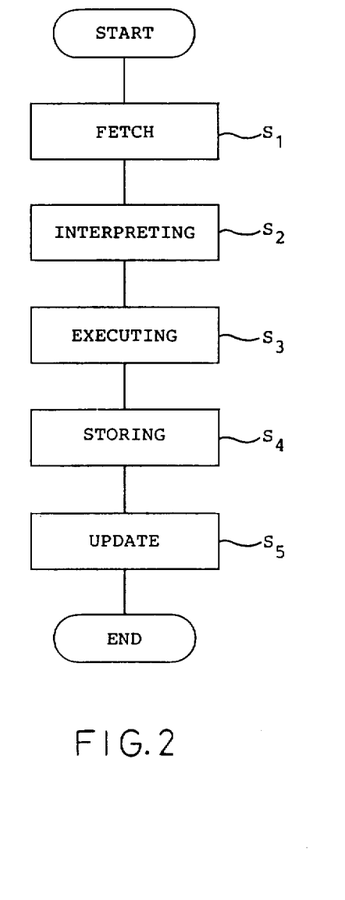
FIG. 2 is a flow chart for illustrating execution of a typical instruction in a processor.

Referring to FIG. 2, execution of the selected instruction by the executing circuit 111 comprises a plurality of sequential steps $S_1$–$S_5$, as has been well known in the art. After start of the executing circuit 111, the selected one of the instructions in main memory 10 is fetched at first step $S_1$ and the fetched instruction is then interpreted at second step $S_2$. Then, an execution such as arithmetic is carried out at a third step $S_3$ and an executed result is stored at the fourth step $S_4$ into a predetermined area, for example, a register in the processor. The final step $S_5$ is a step for updating the instruction address.

In a processor executing a usual instruction, when an error occurs within a range from step $S_1$ to an intermediate point in step $S_4$ just before executed result storing completion, retry can be made from the beginning of the usual instruction. Accordingly, the range is the first period of time as described above. However, on occurrence of an error in another range from the executed result storing completion point in step $S_4$ to step $S_5$, retry of the instruction is impossible. The above-described second period of time is the range from the executed result storing completion point in step $S_4$ to step $S_5$.

In connection with some of the instructions such as instructions for updating contents in the software visible registers and for updating stored data in the main memory 10, retry of the instruction is impossible after updating information in the software visible registers and/or the main memory 10 at step $S_3$ because information required for execution of the instruction is changed by the updating. Therefore, for some instructions, the first period time is a range from step $S_1$ to an intermediate point in step $S_3$ just before completion of updating, while the second period of time is a range from an updating completion point in step $S_3$ to step $S_5$.

Referring to FIG. 1 again, the first processor 11 has an instruction retry enable signal producing circuit 113 being operably coupled with the monitoring circuit 112. The instruction retry enable signal producing circuit 113 produces an instruction retry enable signal during the first period of time. A flipflop is also used as the instruction retry enable signal producing circuit 113 and is set during the first period of time but reset during the second period of time under hardware or microprogram control.

In connection with the above-described some instructions, there are some cases where, even when an error occurs after the updating completion point during execution of an instruction, execution of the instruction can be completed by restart of the microprogram. That is, if the updated information is in no relation with succeeding execution of the instruction, or if the changed information can be recovered by restart from a predetermined microstep or a checkpoint in the microprogram, execution of the instruction is continued by restart of the microprogram from the checkpoint, as described in Reference 1. Restart of the microprogram is not allowable when an error occurs after the executed result storing completion point in step $S_4$. A range from the checkpoint to the executed result storing completion point in step $S_4$ is called a microprogram restart enable interval.

Referring to FIG. 1 again, microprogram restart enable signal producing circuit 114 such as a flipflop 114 is operatively coupled with the monitoring circuit 112 and is set to produce a microprogram restart enable signal during the microprogram restart enable interval under hardware or microprogram control.

Figure 3:
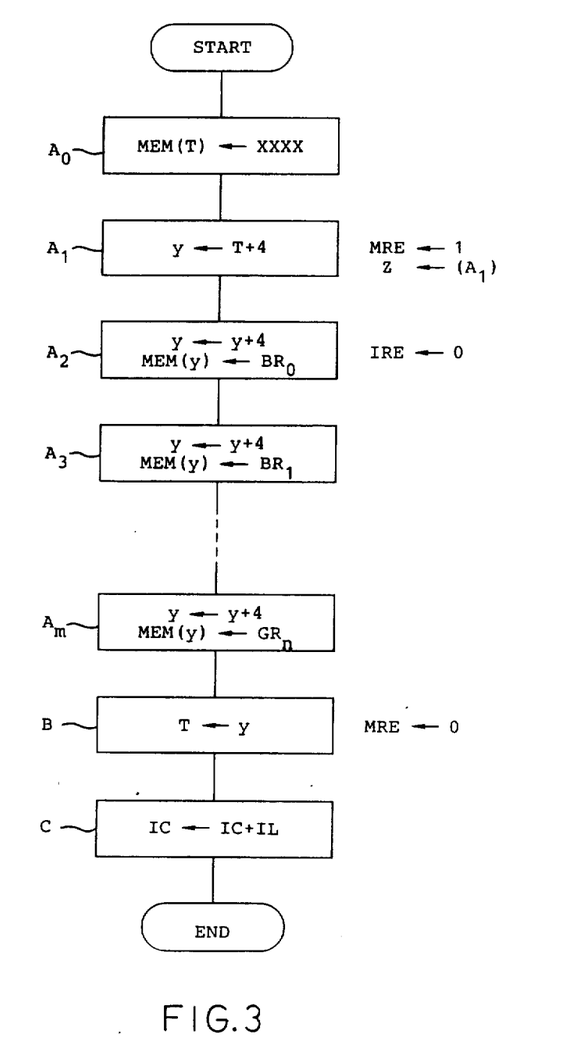
FIG. 3 is a flow chart for exemplarily illustrating a microprogram restart interval in connection with a microprogram for controlling execution of a data save instruction for stacking.

Referring to FIG. 3, a description is exemplarily made as to microsteps for executing a data save instruction for stacking.

A microstep $A_0$ is a preparing step for stacking where data for indicating a plurality of base registers and a plurality of general registers having contents to be saved into the main memory 10 are stored in the main memory according to an address given by content (T) in an address register T. At a next microstep $A_1$, a sum (T+4) of "4" and the content (T) in the address register T is stored in a work register y.

The microstep $A_1$ is predetermined as the above described checkpoint. Therefore, the microprogram restart enable signal (MRE) is produced from the microprogram restart enable signal producing circuit 114 (FIG. 1), that is, the flipflop is set at this microstep $A_1$. At the same time, a microprogram address ($A_1$) corresponding to the microstep $A_1$ is held in a software invisible register Z.

Then, "4" is added to content (y) in the work register y and the result (y+4) is stored in the work register y so that (y)=(y+4) and content ($BR_0$) (having 4 bytes) in the base register $BR_0$ is then stored in the main memory according to an address given by the content (y) in the work register y at a microstep $A_2$.

Since information in the main memory is updated at microstep $A_2$, retry of the instruction is not allowable after microstep $A_2$. Therefore, the instruction retry enable signal producing circuit 113 (FIG. 1) is reset.

Thereafter, similar microstep operations are carried out to save contents in the base registers and general registers. At a microstep $A_m$, a final content ($GR_n$) in the final general register $GR_n$ to be saved in the main memory is stored into the main memory. That is, a sum of "4" and a content (y) in the work register y is stored in the work register and then the content ($GR_n$) in the general register is stored in the main memory according to an address indicated by the content in the work register y.

At a next microstep B, content (y) in the work register y is stored in the address register T which is one of software visible registers. Since the address register is updated, microprogram restart from the checkpoint is not allowable and the microprogram restart signal producing circuit 114 (FIG. 1) is reset at the microstep B and the succeeding microsteps.

Therefore, the microprogram restart from the checkpoint $A_1$ is allowable during a range from microstep $A_1$ to microstep $A_m$. When the microprogram restarts, content (z) in the register Z is written in a microprogram address counter (not shown), and microsteps are again carried out from the microstep $A_1$.

At a microstep C following microstep B, an instruction length (IL) is added to a content (IC) in an instruction counter IC and the result is stored in the instruction counter IC. Thus, the instruction address is updated. This microstep C is the step $S_5$ in FIG. 2.

Returning to FIG. 1, the first processor 11 has a retry request indicator 115 such as a flipflop for holding a retry request manually inputted by an operator, for example, when debug of a program is taken place.

The first processor 11 also has a physical error generator 116 for generating a physical error, which will later be described in detail with reference to FIG. 5.

The processor 12 has an arrangement similar to the above-described arrangement of the processor 11. Detail of the the processor 12 is omitted in the drawing and in the description for the purpose of simplification thereof.

In order to recover an error in one of the first and second processors 11 and 12, an error recovery unit 20 is coupled with those processors 11 and 12 through the system control unit 13. The error recovery unit 20 is connected to a service processor 30.

Assuming that an error occurs in the first processor 11, connection of the error recovery unit 20 and the first processor 11 is shown in FIG. 1 but connection of the unit 20 and the second processor 12 is omitted in the figure for the purpose of simplification of the figure.

The error recovery unit 20 has a connection detector 21 for accessing the connection indicator 132 to detect a connection condition of the second processor 12, an activity detector 22 for accessing the activity indicator 152 to detect whether the second processor 12 is active or inactive, and a taking-over signal producing circuit 23 for producing a taking-over signal (TO) to write the checking condition of the first processor 11 into the first processor check indicator 136. The error recovery unit 20 also has a first accessing circuit 24 for accessing the instruction retry enable signal producing circuit 113 to obtain the instruction retry enable signal (IRE), a second accessing circuit 25 for accessing the microprogram restart enable signal producing circuit 114 to obtain the microprogram restart enable signal (MRE), and a retry request detector 26 for accessing the retry request indicator 115 to detect the retry request (RR) desired by the operator. Those circuits 21–26 are controlled by a control circuit 27 in the unit 20.

Figure 4A:
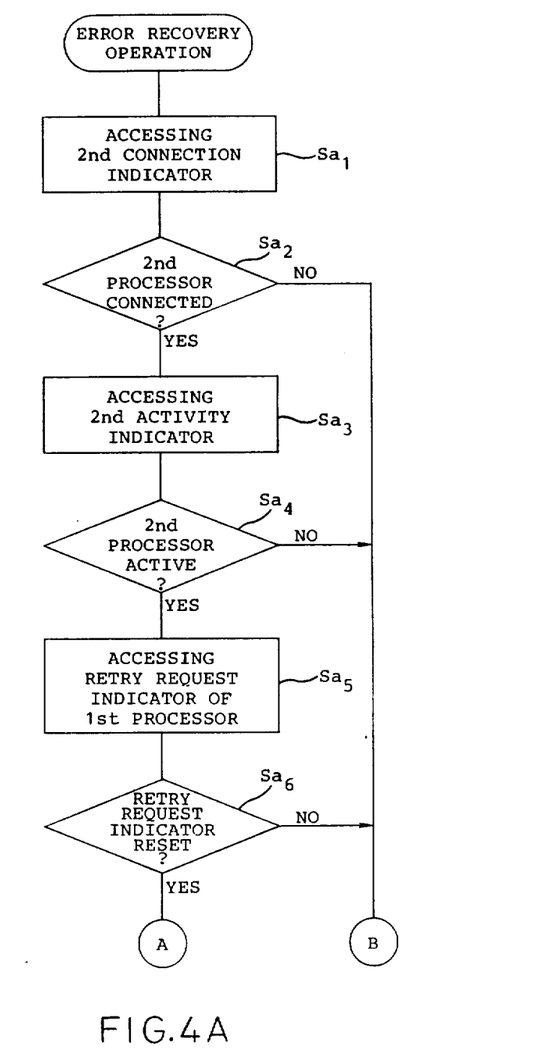
FIGS. 4A, 4B, and 4C are views of different sections of a flow chart illustrating operation of an error recovery unit shown in FIG. 1, Ⓐ and Ⓑ in FIG. 4A being connected to Ⓐ in FIG. 4B and Ⓑ in FIG. 4C, respectively.

Now, operation of the error recovery unit 20 will be described with reference to the flow chart shown in FIGS. 4A to 4C in addition to FIG. 1.

Upon occurrence of an error in the first processor 11, the error recovery unit 20 starts operation for recovering the error in the first processor 11 in response to the error signal ER from the first processor 11. The control circuit 27 enables the connection detector 21 to read a content in the second connection indicator 132 at a stage $Sa_1$. The control circuit 27 decides the read content at a stage $Sa_2$. When the read content indicates that the second processor 12 is connected to the computer system, operation is shifted from stage $Sa_2$ to a stage $Sa_3$ and the control circuit 27 enables the activity detector 22 to detect the content in the second activity indicator 152. Then, the control circuit 27 decides at a stage $Sa_4$ whether the second processor 12 is active or inactive. When the second processor is active, operation progresses to a stage $Sa_5$ and the retry request detector 26 is enabled to read the retry request indicator 115. When the retry request is decided at a next stage $Sa_6$, operation is shifted from stage $Sa_6$ to a stage $Sa_7$ (FIG. 4B). At stage $Sa_7$, the control circuit 27 enables the first accessing circuit 24 to access the instruction retry enable signal producing circuit 113. When the instruction retry enable signal (IRE) is read out from the instruction retry enable signal generating circuit 113, operation progresses to a stage $Sa_9$ through a stage $Sa_8$. At stage $Sa_9$, the control circuit 27 drives the taking-over signal producing circuit 23 to produce the taking-over signal (TO) which sets the first processor check indicator 136 to write the checking condition of the first processor 11 thereinto.

When the instruction retry enable signal (IRE) is not decided at stage $Sa_8$, operation is shifted from stage $Sa_8$ to a stage $Sa_{10}$ where the microprogram restart enable signal producing circuit 114 is accessed by the second accessing circuit 25. When the microprogram restart enable signal (MRE) is not detected at the stage $Sa_{11}$, operation is shifted from the stage $Sa_{11}$ to stage $Sa_9$.

As has been noted from the above description, the control circuit 27 sets the first processor check indicator 136 when the instruction retry enable signal (IRE) is detected and also when neither the instruction retry enable signal (IRE) nor the microprogram restart enable signal (MRE) is not detected.

In response to the taking-over signal (TO), the status signals in the first processor 11 are transferred to the second processor 12 in a known manner as disclosed in References 1–3 and the instruction processed in the first processor 11 on occurrence of the error is again executed from the beginning of the instruction in the second processor 12.

Namely, when the processor check indicator 136 is set by the taking-over signal (TO), the system control unit 13 informs to the second processor 12 and the service processor 30 of a fact that the first processor 11 is put into the checking condition of the processor. The second processor 12 alerts an exception processing program stored in the operation system (OS) 14. While, the service processor 30 transfers the status signals or contents in the software visible registers in the first processor 11 into a predetermined area in the main memory 10.

In this connection, the status signals can be transferred into a storage described in Reference 3.

Then, the exception processing program is executed in the second processor 12. That is, the status signals are read out from the main memory 10 or the storage, and it is decided whether or not retry of execution of the instruction processed in the first processor 11 on occurrence of the error is possible. When retry of execution is possible, execution of the instruction is retried in the second processor.

Returning to stage $Sa_{11}$, when it is decided that the microprogram restart enable signal (MRE) is read out, the first processor 11 is reset at a stage $Sa_{12}$. Then, the control circuit 27 generates a microprogram restart signal ($MR_1$) which is applied to the first processor 11 at a stage $Sa_{13}$. Then, the first processor 11 restarts the microprogram from the checkpoint.

Figure 5:
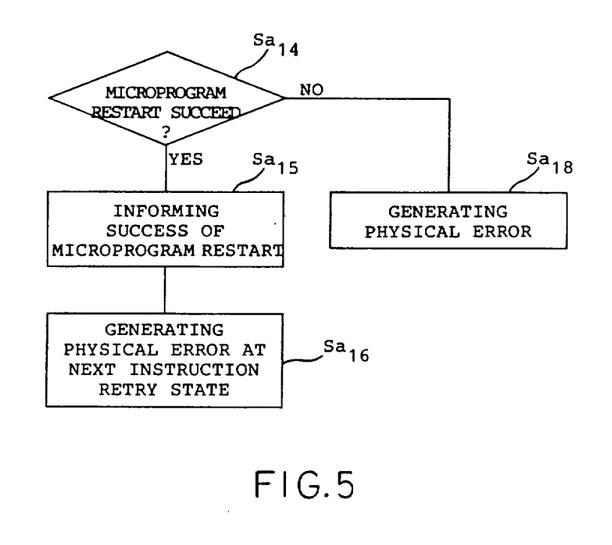
FIG. 5 is a flow chart for illustrating operation of a physical error generator shown in FIG. 1.

Referring to FIG. 5 and FIG. 1, a description will be made as to the operation of the first processor 11 after restart of the microprogram.

In response to the microprogram restart signal ($MR_1$), the physical error generator 116 cooperates with the monitoring circuit 112 and decides whether or not the microprogram restart ends in success (stage $Sa_{14}$ in FIG. 5). When success is decided, the physical error generator 116 produces a success informing signal (SI) to thereby inform to the error recovery unit 20 of success of microprogram restart (stage $Sa_{15}$). The physical error generator 116 also accesses the instruction retry enable signal producing circuit 113. Thereafter, when the instruction retry enable signal producing circuit 113 is set by execution of an instruction freshly fetched in the first processor 11 from the main memory 10, the physical error generator 116 generates a physical error signal (PE) at a stage $Sa_{16}$.

Figure 4B:
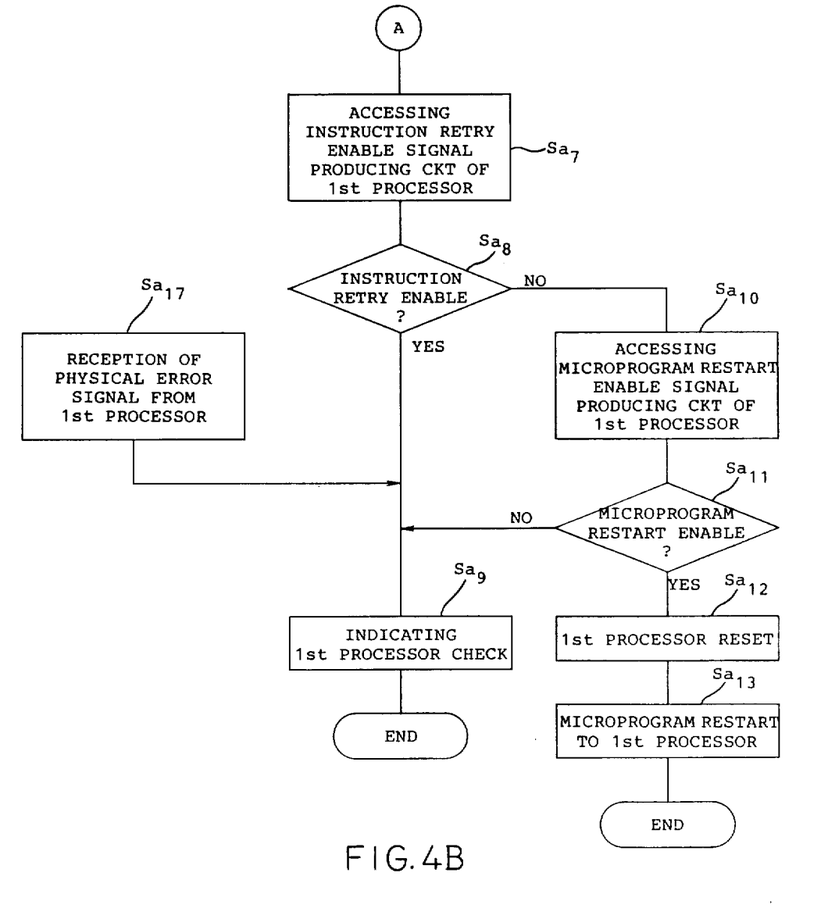
Figure 4C:
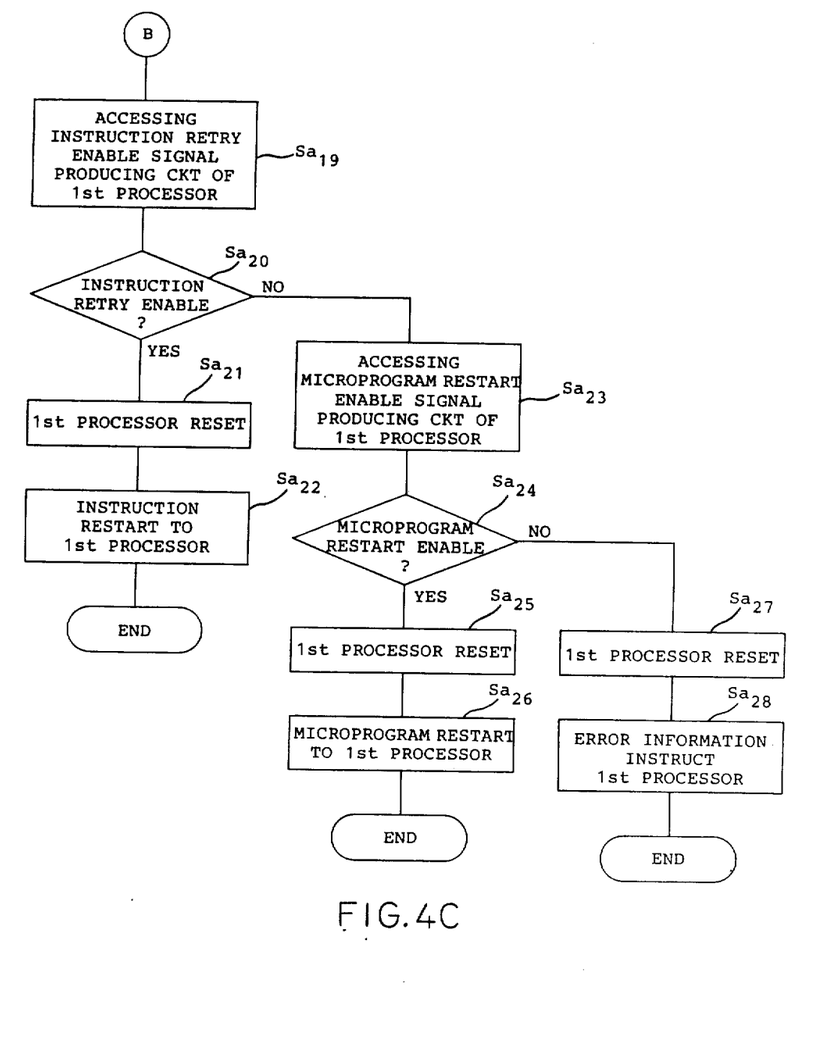

Now, going back to FIG. 4B, on reception of the physical error signal (PE) at a stage $Sa_{17}$, the control circuit 27 of the error recovery unit 20 carries out the operation in stage $Sa_9$ to set the first processor check indicator 136. Thus, execution of the instruction freshly fetched in the first processor 11 is taken over by the second processor 12 through the above-described status signal transferring manner.

In FIG. 5, when it is not decided at stage $Sa_{14}$ that the microprogram restart ends in success, the physical error generator 116 generates the physical error signal (PE) at a stage $Sa_{18}$. Then, the control circuit 27 in error recovery unit 20 also carries out operation in stages $Sa_{17}$ and $Sa_9$, so that the processor check indicator 136 is set.

Returning to stage $Sa_2$ (FIG. 4A), when the connection of the second processor 12 is not decided, the control circuit 27 effects operation at stage $Sa_{19}$ (FIG. 4C) to access the instruction retry enable signal producing circuit 113 by the first accessing circuit 24.

When the second processor 12 is decided inactive at stage $Sa_4$, or when the retry request is detected at stage $Sa_6$, operation of the control circuit 27 also progresses to the step $Sa_{19}$.

When the instruction retry enable signal (IRS) is decided at a stage $Sa_{20}$ after stage $Sa_{19}$, the control circuit 27 resets the first processor 11 at a stage $Sa_{21}$ and provides an instruction retry signal (IR) to the first processor 11 at a stage $Sa_{22}$. Thus, the first processor 11 carries out retry of execution of the instruction.

When the instruction retry enable signal (IRS) is not detected at stage $Sa_{20}$, the microprogram restart enable signal producing circuit 114 is accessed by the second accessing circuit 25 at a stage $Sa_{23}$. When the microprogram restart enable signal (MRE) is detected at a stage $Sa_{24}$, the control circuit 27 resets the first processor 11 at a stage $Sa_{25}$ and then provides a microprogram restart signal ($MR_2$) to the first processor 11. Restart of the microprogram is taken place from the checkpoint in the first processor 11.

When the microprogram restart enable signal (MRE) is not detected at stage $Sa_{24}$, the control circuit 27 resets the first processor 11 at a stage $Sa_{27}$. Then, the control circuit 27 produces an error informing command signal (EIC) for making the first processor 11 inform of the fault to the operating system (OS) 14 at a stage $Sa_{28}$.

What is claimed is:

1. An error recovery system for use in combination with an electronic computer system comprising a main memory for storing a plurality of programs and a plurality of processors for processing said programs, each program comprising a succession of instructions, each processor comprising:

executing means for fetching selected ones of said instructions and for executing under microprogram control each of the selected instructions, during a first period of time during which retry of execution of the selected instruction is allowable and a second period of time during which retry of execution of said selected instruction is not allowable, to produce masses of information, said microprogram comprising a succession of microsteps and having a first interval during which restart of the microprogram is allowable from a checkpoint at a predetermined microstep, monitoring means for monitoring operation of said executing means to produce an error signal when an error is detected during execution of a particular one of the selected instructions and to suspend execution of the particular instruction, instruction retry enable signal producing means operatively coupled to said monitoring means for producing an instruction retry enable signal during said first time period, and microprogram restart enable signal producing means operatively coupled to said monitoring means for producing a microprogram restart enable signal during said first interval, said error recovery system being responsive to the error signal from said monitoring means in a first of said processors for accessing said microprogram restart enable signal producing means in said first processor to produce a microprogram restart signal when said microprogram restart enable signal is detected from said microprogram restart enable signal producing means, said first processor carrying out, in response to said microprogram restart signal, restart of the microprogram from said checkpoint, said error recovery system being energized on occurrence of a physical error in said first processor to produce a taking-over signal for making a second of said processors take over execution of the particular instruction, wherein said first processor further comprises physical error signal generating means operatively coupled with said monitoring means therein for detecting, after a retry of said microprogram is successfully completed in by restarting from said checkpoint of said microprogram, said instruction retry enable signal from said instruction retry enable signal producing means in said first processor to produce a physical error signal; and said error recovery system comprises means responsive to said physical error signal for producing said taking-over signal to thereby put said first processor in a checking condition.

2. An error recovery system as claimed in claim 1, further comprising first accessing means responsive to said error signal from said first processor for accessing said instruction retry enable signal producing means in said first processor to produce a first enable signal when the instruction retry enable signal is detected from said instruction retry enable signal producing means in said first processor, and said taking-over signal producing means being coupled with said first accessing means and producing said taking-over signal in response to said first enable signal.

3. An error recovery system as claimed in claim 2, said main memory further comprising activity indicating means for indicating an active condition of said second processor, said error recovery system further comprising activity detecting means responsive to said error signal for accessing said activity indicating means to produce an inactive signal when no active condition of said second processor is detected in said active indicating means, said taking-over signal producing means being also coupled with said activity detecting means and being put in an inactive condition by said inactive signal.

4. An error recovery system as claimed in claim 3, said error recovery system further comprising instruction retry instructing means responsive to said first enable signal and said inactive signal for producing an instruction retry signal to said first processor, said first processor carrying out retry of execution of the particular instruction in response to said instruction retry signal.

5. An error recovery system as claimed in claim 2, said first processor further comprising retry request indicating means for holding a retry request manually inputted, and said error recovery system further comprising retry request detecting means responsive to said error signal for accessing said retry request indicating means to produce a second enable signal when said retry request is detected from said retry request indicating means, said taking-over signal generating means being coupled with said retry request detecting means and being put in an inactive condition by said second enable signal, and instruction retry instructing means responsive to said first enable signal and said second enable signal for producing an instruction retry signal to said first processor, said first processor retrying execution of the particular instruction in response to said instruction retry signal.

6. An error recovery system as claimed in claim 1, further comprising processor check indicating means responsive to said taking-over signal for indicating a condition that said first processor should be checked.

* * * * *